United States Patent
Sun et al.

(10) Patent No.: US 12,537,984 B2
(45) Date of Patent: Jan. 27, 2026

(54) METHOD OF VIDEO DOWNLOADING, METHOD OF VIDEO TRANSMISSION, TERMINAL DEVICE, SERVER AND STORAGE MEDIUM

(71) Applicant: BEIJING BYTEDANCE NETWORK TECHNOLOGY CO., LTD., Beijing (CN)

(72) Inventors: Liyang Sun, Los Angeles, CA (US); Wei He, Beijing (CN); Aoyang Zhang, Beijing (CN); Qian Ma, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 43 days.

(21) Appl. No.: 18/721,346

(22) PCT Filed: Mar. 15, 2023

(86) PCT No.: PCT/CN2023/081525
§ 371 (c)(1),
(2) Date: Jun. 18, 2024

(87) PCT Pub. No.: WO2023/197811
PCT Pub. Date: Oct. 19, 2023

(65) Prior Publication Data
US 2025/0063216 A1  Feb. 20, 2025

(30) Foreign Application Priority Data
Apr. 12, 2022  (CN) .......................... 202210383767.1

(51) Int. Cl.
H04N 21/238  (2011.01)
H04N 21/24  (2011.01)

(52) U.S. Cl.
CPC ... H04N 21/23805 (2013.01); H04N 21/2401 (2013.01)

(58) Field of Classification Search
CPC .................... H04N 21/23805; H04N 21/2401
See application file for complete search history.

(56) References Cited

U.S. PATENT DOCUMENTS 9,654,528 B1      5/2017   Cho et al.
9,838,687 B1 *   12/2017   Banta ................... H04N 23/698
(Continued)

FOREIGN PATENT DOCUMENTS

CN       105451075 A     3/2016
CN       108632631 A    10/2018
(Continued)

OTHER PUBLICATIONS

China National Intellectual Property Administration, Notice of Allowance Issued in Application No. 202210383767.1, May 7, 2024, 5 pages.

(Continued)

*Primary Examiner* — Mulugeta Mengesha
(74) *Attorney, Agent, or Firm* — Alleman Hall & Tuttle LLP

(57) ABSTRACT

A method and apparatus of video downloading, a method and apparatus of video transmission, a terminal device, a sever and a medium are provided. The method of video downloading includes: acquiring a buffer length; generating a video data downloading request according to the buffer length; and sending the video data downloading request to a server, and downloading target video data according to a received request result returned by the server with respect to the video data downloading request.

19 Claims, 6 Drawing Sheets

(56) References Cited

U.S. PATENT DOCUMENTS

| | | | | |
|---|---|---|---|---|
| 10,826,964 B2* | 11/2020 | Han | ...................... | H04L 65/752 |
| 2019/0387214 A1* | 12/2019 | Huang | ................. | H04N 21/442 |

FOREIGN PATENT DOCUMENTS

| | | | |
|---|---|---|---|
| CN | 109286855 | A | 1/2019 |
| CN | 110149542 | A | 8/2019 |
| CN | 110198495 | A | 9/2019 |
| CN | 110430453 | A | 11/2019 |
| CN | 111083523 | A | 4/2020 |
| CN | 112468828 | A | 3/2021 |
| CN | 112565606 | A | 3/2021 |
| CN | 112714315 | A | 4/2021 |
| CN | 112822564 | A | 5/2021 |
| CN | 114095756 | A | 2/2022 |
| CN | 114979762 | A | 8/2022 |
| CN | 114979762 | B | 6/2024 |
| WO | 2017031692 | A1 | 3/2017 |
| WO | 2019157803 | A1 | 8/2019 |

OTHER PUBLICATIONS

China National Intellectual Property Administration, Office Action Issued in Application No. 202210383767.1, Jan. 11, 2024, 22 pages.
ISA China National Intellectual Property Administration, International Search Report and Written Opinion Issued in Application No. PCT/CN2023/081525, Jun. 16, 2023, WIPO, 10 pages.

* cited by examiner

METHOD OF VIDEO DOWNLOADING, METHOD OF VIDEO TRANSMISSION, TERMINAL DEVICE, SERVER AND STORAGE MEDIUM

CROSS-REFERENCE TO RELATED APPLICATIONS

This application is a national stage application of International Patent Application No. PCT/CN2023/081525, filed on Mar. 15, 2023, which claims the priority to and benefits of the Chinese Patent Application No. 202210383767.1, which was filed on Apr. 12, 2022. All the aforementioned patent applications are hereby incorporated by reference in their entireties.

TECHNICAL FIELD

Embodiments of the present disclosure relates to the technical field of panoramic videos, for example, to a method and apparatus of video downloading, a method and apparatus of video transmission, a terminal device, a server and a medium.

BACKGROUND

In a viewing scene of a panoramic video, in order to allow a user to watch video data from any viewing angle, a user device usually downloads the entire panoramic video (360*180 degrees) from the server that stores the panoramic video. However, in the panoramic video, only the video data within the user viewing angle can be watched by the user.

SUMMARY

The embodiments of the present disclosure provide a method and apparatus of video downloading, a method and apparatus of video transmission, a terminal device, a server and a medium.

In the first aspect, the embodiments of the present disclosure provide a method of video downloading, which can be applied to a client, and the method may include: acquiring a buffer length, wherein the buffer length includes at least one selected from the group consisting of: in a panoramic video, the first current buffer length and the first target buffer length of the first video data corresponding to a target viewing angle, and the second current buffer length and the second target buffer length of the second video data corresponding to a user viewing angle, the user viewing angle includes a viewing angle of a video-viewing user of the panoramic video, a coverage area of the target viewing angle is greater than a coverage area of the user viewing angle, and a video quality of the first video data is lower than a video quality of the second video data;
    generating a video data downloading request according to the buffer length, wherein the video data downloading request is a request for downloading target video data in the panoramic video stored in a server, and the target video data is associated with at least one selected from the group consisting of the first video data or the second video data; and
    sending the video data downloading request to the server, and downloading the target video data according to a received request result returned by the server with respect to the video data downloading request.

In the second aspect, the embodiments of the present disclosure further provide a method of video transmission, which can be applied to a server storing panoramic video, and the method may include:
    receiving a video data downloading request sent by a client, wherein the video data downloading request includes a request for downloading target video data in the panoramic video generated according to a buffer length, and the target video data is associated with at least one selected from the group consisting of first video data or second video data;
    returning a request result corresponding to the video data downloading request to the client, and causing the client to download the target video data transmitted by the server according to the request result received;
    wherein the buffer length includes at least one selected from the group consisting of: in a panoramic video, the first current buffer length and the first target buffer length of the first video data corresponding to a target viewing angle, and the second current buffer length and the second target buffer length of the second video data corresponding to a user viewing angle, the user viewing angle includes a viewing angle of a video-viewing user of the panoramic video, a coverage area of the target viewing angle is greater than a coverage area of the user viewing angle, and a video quality of the first video data is lower than a video quality of the second video data.

In the third aspect, the embodiments of the present disclosure further provide a video downloading apparatus, which can be configured in a client, and the apparatus may include a buffer length acquiring module, a downloading request generating module and a target video data downloading module.

The buffer length acquiring module is configured to acquire a buffer length. The buffer length includes at least one selected from the group consisting of: in a panoramic video, the first current buffer length and the first target buffer length of the first video data corresponding to a target viewing angle, and the second current buffer length and the second target buffer length of the second video data corresponding to a user viewing angle. The user viewing angle includes a viewing angle of a video-viewing user of the panoramic video, a coverage area of the target viewing angle is greater than a coverage area of the user viewing angle, and a video quality of the first video data is lower than a video quality of the second video data.

The downloading request generating module is configured to generate a video data downloading request according to the buffer length. The video data downloading request includes a request for downloading target video data in the panoramic video stored in a server, and the target video data is associated with at least one selected from the group consisting of the first video data or the second video data.

The target video data downloading module is configured to send the video data downloading request to the server, and download the target video data according to a received request result returned by the server with respect to the video data downloading request.

In the fourth aspect, the embodiments of the present disclosure further provide a video transmission apparatus, which can be configured in a server storing panoramic video, and the apparatus may include a downloading request receiving module and a target video data transmitting module.

The downloading request receiving module is configured to receive a video data downloading request sent by a client.

The video data downloading request includes a request for downloading target video data in the panoramic video generated according to a buffer length, and the target video data is associated with at least one selected from the group consisting of first video data or second video data.

The target video data transmitting module is configured to return a request result corresponding to the video data downloading request to the client, and cause the client to download the target video data transmitted by the server according to the request result received.

The buffer length includes at least one selected from the group consisting of: in a panoramic video, the first current buffer length and the first target buffer length of the first video data corresponding to a target viewing angle, and the second current buffer length and the second target buffer length of the second video data corresponding to a user viewing angle, the user viewing angle includes a viewing angle of a video-viewing user of the panoramic video, a coverage area of the target viewing angle is greater than a coverage area of the user viewing angle, and a video quality of the first video data is lower than a video quality of the second video data.

In the fifth aspect, the embodiments of the present disclosure further provide a terminal device, which may include one or more processors and a memory.

The memory is configured to store one or more programs.

When the one or more programs are executed by the one or more processors, the one or more processors are caused to implement the method of video downloading provided by any embodiment of the present disclosure.

In the sixth aspect, the embodiments of the present disclosure further provide a server, which may include one or more processors and a memory.

The memory is configured to store one or more programs.

When the one or more programs are executed by the one or more processors, the one or more processors is caused to implement the method of video transmission provided by any embodiment of the present disclosure.

In the seventh aspect, the embodiments of the present disclosure further provide a computer-readable storage medium. The computer-readable storage medium stores computer programs. When the computer programs are executed by a processor, the method of video downloading or the method of video transmission provided by any embodiment of the present disclosure is implemented.

BRIEF DESCRIPTION OF DRAWINGS

Throughout the drawings, the same or similar reference numerals indicate the same or similar elements. It should be understood that the drawings are schematic, and the originals and elements are not necessarily drawn to scale.

DETAILED DESCRIPTION

Figure 1:
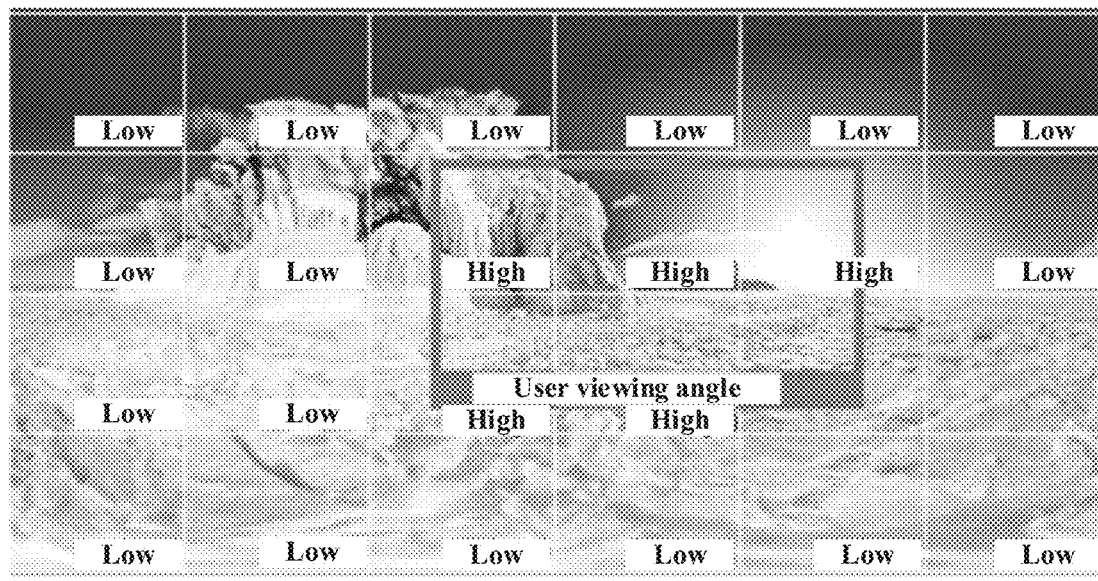
FIG. 1 is a schematic diagram of a base tier and an enhancement tier displayed through a video picture of a certain frame in a panoramic video in an exemplary illustration of an application scenario of an embodiment of the present disclosure.

In a viewing scene of a panoramic video, in order to allow a user to watch video data from any viewing angle, a user device usually downloads the entire panoramic video (360*180 degrees) from the server that stores the panoramic video. However, in the panoramic video, only the video data within the user viewing angle can be watched by the user, which results in the waste of downloading the video data outside the user viewing angle, and simultaneously limits the video quality of the video data within the user viewing angle.

For this, a solution is that the user device only downloads the video data within the user viewing angle, which can maximize the use of bandwidth resources to enhance the video quality of the video data within the user viewing angle. However, when the user viewing angle changes suddenly, the user can watch the video data that has not been downloaded, which results in the situation that the video data is missing.

Therefore, it can be discussed how to allow the user to watch the video data with high video quality without the situation that the video data is missing, so as to improve the user's viewing experience to the greatest extent.

For the above-mentioned situation, the embodiments of the present disclosure provide a method and apparatus of video downloading, a method and apparatus of video transmission, a terminal device, a server and a medium.

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more".

Names of messages or information exchanged among more apparatuses in the embodiments of the present disclosure are only used for illustrative purposes, and are not used to limit the scope of these messages or information.

In the following embodiments, optional features and examples are provided in each embodiment at the same time. Various features described in the embodiments can be combined to form more embodiments, and each numbered embodiment should not be regarded as only one embodiment.

Before introducing the embodiments of the present disclosure, the application scenario of the embodiments of the present disclosure is illustrated schematically. A panoramic video may be understood as a 360*180-degree video, for example, may be an original panoramic video (i.e., an unprocessed panoramic video obtained after shooting the real reality), a Virtual Reality (VR) panoramic video, an Augmented Reality (AR) panoramic video and a Mixed Reality (MR) panoramic video. A video-viewing user can watch the panoramic video through a terminal device. The terminal device may be a head-mounted display device, a mobile phone, a tablet computer, a notebook and the like. As mentioned above, in order to allow the video-viewing user to watch the video data with high video quality without the situation that the video data is missing, the embodiments of the present disclosure propose embodiments of hierarchically transmitting/downloading a panoramic video (i.e., divided into two tiers, a base tier (BT) and an enhancement tier (ET)).

For example, the first video data in the base tier is the video data with low definition in panoramic video and corresponding to a target viewing angle whose coverage area is greater than the coverage area of the user viewing angle, which is set for last resort and avoids the situation that video data is missing when the user viewing angle of the video-viewing user suddenly changes, and the first video data does not occupy too much network bandwidth. The second video data in the enhancement tier is the video data with high definition in panoramic video and corresponding to the user viewing angle, and the user viewing angle can be expressed in various ways, such as a viewing angle direction (e.g., front, back, top, bottom, left, right, etc.), a viewing angle range (e.g., the range of degrees from top to bottom and from left to right) and the like. For example, as illustrated in FIG. 1, which is a video picture of a certain frame in the panoramic video and takes the target viewing angle being a complete viewing angle (i.e. 360*180 degrees) as an example, the video data corresponding to the entire video picture can be understood as the first video data, and the video data corresponding to the video picture framed by a rectangle frame (i.e., corresponding to the user viewing angle) can be understood as the second video data.

Embodiment 1

Figure 2:
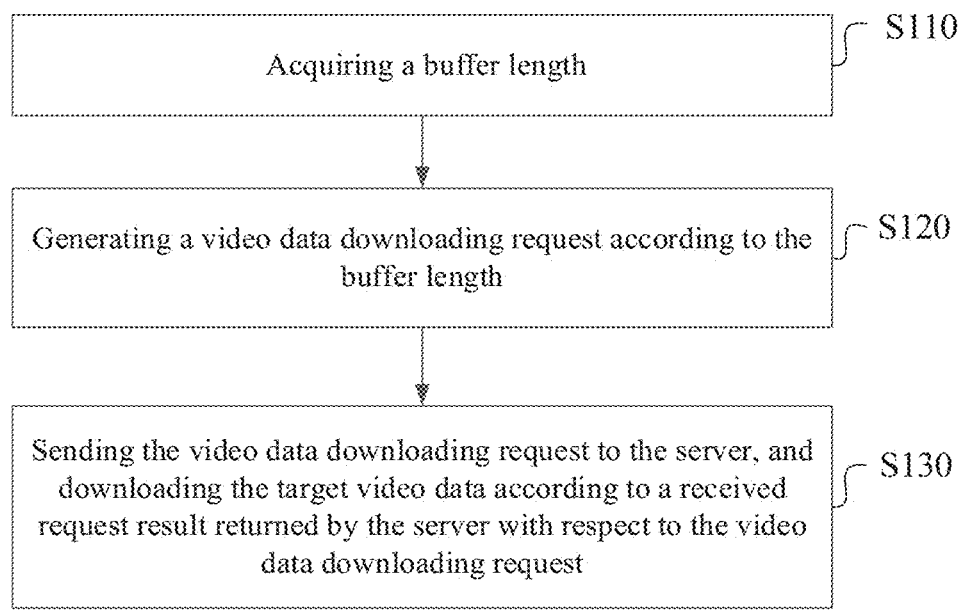
FIG. 2 is a flowchart of a method of video downloading in the first embodiment of the present disclosure.

FIG. 2 is a flowchart of a method of video downloading in the first embodiment of the present disclosure. In the present embodiment, a panoramic video can be downloaded, and a panoramic video that can not only ensure the video quality of the video data watched by the user but also prevent the video data missing can also be downloaded. The method can be executed by the video downloading apparatus provided by the embodiments of the present disclosure, the apparatus can be implemented by software and/or hardware, and the apparatus can be integrated on the terminal device.

Referring to FIG. 2, the method of the embodiment of the present disclosure includes the following steps:

S110: acquiring a buffer length. The buffer length includes at least one selected from the group consisting of: in a panoramic video, the first current buffer length and the first target buffer length of the first video data corresponding to a target viewing angle, and the second current buffer length and the second target buffer length of the second video data corresponding to a user viewing angle. The user viewing angle includes a viewing angle of a video-viewing user of the panoramic video, a coverage area of the target viewing angle is greater than a coverage area of the user viewing angle, and a video quality of the first video data is lower than a video quality of the second video data.

The user viewing angle may be a viewing angle when the video-viewing user watches the panoramic video, may be a viewing angle of the video-viewing user at the current moment captured in real time, and may be a viewing angle of the video-viewing user at a certain future time point/in a certain future time period obtained by predicting, which is not specifically limited here. The target viewing angle may be a viewing angle whose coverage is greater than the user viewing angle, i.e., the target viewing angle can wrap the entire user viewing angle and include the viewing angles that are not included in the user viewing angle. In practical applications, for example, in order to eliminate the situation that the video data is missing, the target viewing angle can be a complete viewing angle. The first video data may be the video data corresponding to the target viewing angle in the panoramic video. The first current buffer length may be the actual length of the first video data in a buffered state (i.e., have been buffered and not yet played) at the current moment. The first target buffer length may be the target length of the first video data in the buffered state, which is a length determined to avoid that a stuttering phenomenon occurs in the process of playing the first video data. Accordingly, the second video data may be the video data corresponding to the user viewing angle and whose video quality is higher than the video quality of the first video data in the panoramic video. The second current buffer length may be the actual length of the second video data in the buffered state at the current moment. The second target buffer length may be the target length of the second video data in the buffered state, which is a length determined to avoid that a stuttering phenomenon occurs in the process of playing the second video data. A buffer length is acquired, and the buffer length includes at least one selected from the group consisting of the first current buffer length, the first target buffer length, the second current buffer length and the second target buffer length.

In practical applications, for example, when the user viewing angle is a viewing angle of a user in a certain future time period obtained by predicting, the time duration of the future time period (i.e., the prediction time interval of the user viewing angle) may be a time duration related to the second target buffer length. For example, the second target buffer length may determine the prediction time interval, for example, the second target buffer length is 3 seconds(s) and the prediction time interval may also be 3 s, then the user viewing angle may be the viewing angle in the first 3 s of the unpredicted time period (i.e., the future time period). It should be noted that the accuracy of user viewing angle prediction usually decreases with the increase of the prediction time interval, so the second target buffer length cannot be set too long. However, conversely, the second target buffer length cannot be set too short, because when the network bandwidth is poor, it is prone to the situation that all the second video data that has been buffered is played out, which results in the missing of the second video data with high video quality. On this basis, for another example, when the target viewing angle is a complete viewing angle, because the target viewing angle does not need to be obtained by viewing angle prediction, in order to prevent the video stuttering, a longer first target buffer length can be set, i.e., the first target buffer length can be greater than the second target buffer length. When the network bandwidth is good, the downloading speed of the first video data can be guaranteed, so the first target buffer length can also be equal to the second target buffer length, which is not specifically limited here.

S120: generating a video data downloading request according to the buffer length. The video data downloading request is a request for downloading target video data in the panoramic video stored in a server, and the target video data is associated with at least one selected from the group consisting of the first video data or the second video data.

Generating a video data downloading request according to the buffer length, is determining what kind of video data (called the target video data here) in panoramic video is to be downloaded according to the buffer length, and then generating the corresponding video data downloading request. The target video data may include video data associated with the first video data and/or the second video data, such as video data that belongs to the first video data and/or the second video data, video data determined according to the first video data and/or the second video data, etc., which is not specifically limited here. In practical applications, for example, when the target video data is not only associated with the first video data, but also associated with the second video data, the video data downloading request can be understood as a request for downloading the base layer and the enhancement tier in parallel.

S130: sending the video data downloading request to the server, and downloading the target video data according to a received request result returned by the server with respect to the video data downloading request.

Because the panoramic video is stored in the server, the video data downloading request can be sent to the server, and then the target video data can be downloaded according to the request result when receiving the request result returned by the server with respect to the video data downloading request. If the request result is the storage address of the target video data in the server, the target video data can be downloaded from the server according to the storage address; and if the request result is the target video data itself, the purpose of downloading the target video data can be achieved directly by receiving the target video data.

It should be noted that, in the above-mentioned embodiment, the first video data and second video data to be buffered are scheduled and downloaded through the buffer length, which can not only download the second video data with high video quality corresponding to the user viewing angle, but also download the first video data corresponding to the target viewing angle whose coverage area is greater than the user viewing angle. In other words, the video quality of the second video data can be enhanced by using bandwidth resources to the greatest extent. Moreover, when the user viewing angle obtained by predicting has an offset or the video-viewing user suddenly changes the viewing angle, the video-viewing user can be allowed to watch the first video data, so as to avoid the situation that the video data is missing, thereby improving the viewing experience of the video-viewing user for panoramic video to the greatest extent.

In the embodiment of the present disclosure, by acquiring a buffer length, a video data downloading request for downloading target video data of a panoramic video stored in a server is generated according to the buffer length. The target video data may include video data associated with the first video data and/or the second video data corresponding to the buffer length. Further, the video data downloading request is sent to the server, and the target video data is downloaded according to the received request result returned by the server with respect to the video data downloading request. The above-mentioned embodiment improves the viewing experience of the video-viewing user for panoramic video.

In an embodiment, on the basis of the first embodiment, the above-mentioned method of video downloading may further include: acquiring historical bandwidth information and historical bandwidth prediction accuracy, predicting a network bandwidth when downloading the target video data according to the historical bandwidth information and the historical bandwidth prediction accuracy, and determining the first target buffer length according to the network bandwidth; and/or, when the user viewing angle is a predicted viewing angle of the video-viewing user when watching the second video data to be buffered, acquiring historical viewing angle prediction accuracy, and determining the second target buffer length according to the historical viewing angle prediction accuracy and the network bandwidth.

The historical bandwidth information may be information related to the network bandwidth at a historical moment before the current moment, such as the numerical value and/or fluctuation of the historical bandwidth. The historical bandwidth prediction accuracy may be the prediction accuracy of network bandwidth in the future time period relative to the historical time at that historical time. According to the historical bandwidth information and the historical bandwidth prediction accuracy, the network bandwidth when downloading the target video data can be predicted, which can determine the network speed at which the target video data can be downloaded at that time, and then the first target buffer length can be determined. For example, a better network bandwidth can ensure the downloading speed of the target video data, so a shorter first target buffer length can be set when the network bandwidth is better, because the target video data that can be downloaded in time will not cause video stuttering; conversely, a longer first target buffer length can be set. In the above-mentioned embodiment, the first target buffer length is determined according to the network bandwidth predicted when downloading the target video data, and the target video data downloaded can avoid the video stuttering phenomenon.

When the user viewing angle is the predicted viewing angle of the video-viewing user when watching the second video data to be buffered, the historical viewing angle prediction accuracy used to indicate the prediction accuracy of the user viewing angle in the future time period relative to the historical moment at that historical moment can be acquired, and then the second target buffer length can be determined according to the historical viewing angle prediction accuracy and the network bandwidth. For example, when the historical viewing angle prediction accuracy is low and the network bandwidth is good, a shorter second target buffer length can be set, which can not only decrease the risk that the prediction of the user viewing angle is inaccurate, but also avoid the video stuttering phenomenon; conversely, a longer second target buffer length can be set. In the above-mentioned embodiment, the second target buffer length is determined on time and/or in real time by the prediction accuracy of the historical viewing angle and the network bandwidth predicted when downloading the target video data, the target video data downloaded by which can not only allow the video-viewing user to watch the video data with high video quality, but also avoid the situation that the video data with high video quality is missing.

In an embodiment, on the basis of the first embodiment, the generating a video data downloading request according to the buffer length may include: predicting a network bandwidth when downloading the target video data; and generating the video data downloading request according to the buffer length and the network bandwidth, wherein a target code rate of the target video data represented by the video data downloading request is related to the network bandwidth. The first video data and/or the second video data can correspond to at least two candidate code rates, which means that the target video data associated with the first video data and/or the second video data can also correspond to at least two candidate code rates. Because the target video data with different candidate code rates need to obtain the support of different network bandwidths to be downloaded normally, for example, target video data with a high code rate need to obtain the support of a good network bandwidth, the video data downloading request generated according to the buffer length and the network bandwidth can not only indicate whether the target video data to be downloaded is associated with the first video data or the second video data, but also indicate the target video data of which candidate bit rate (i.e., the target bit rate) needs to be downloaded.

In an embodiment, on the basis of the first embodiment, a buffer is set in a terminal device configured with the client, and the buffer includes the first buffer for buffering the first video data downloaded and the second buffer for buffering the second video data downloaded. After downloading the target video data, the above-mentioned method of video downloading may also include: buffering the target video data into a buffer associated with the target video data; when playing current video data in the panoramic video, in response to the second video data corresponding to the current video data being buffered in the second buffer, acquiring and playing the corresponding second video data from the second buffer; in response to the second video data corresponding to the current video data being not buffered in the second buffer, determining whether first video data corresponding to the current video data is buffered in the first buffer; and in response to the first video data corresponding to the current video data being buffered in the first buffer, acquiring and playing the first video data corresponding to the current video data from the first buffer.

When the target video data is associated with the first video data, the target video data can be buffered in the first buffer. When the target video data is associated with the second video data, the target video data can be buffered in the second buffer. In this way, later, when playing the target video data is played, the target video data can be directly obtained from the buffer where the target video data is stored and played. On this basis, for the current video data in panoramic video (which may be the target video data that has been downloaded and obtained before, or may be the target video data that has not been downloaded and obtained yet) that needs to be played at the current moment or in the current time period, in order to allow a video-viewing user to watch video data with high video quality, whether the second video data corresponding to the current video data (i.e., the second video data with the essentially same video content) is buffered in the second buffer can be determined firstly, and if the second video data corresponding to the current video data is buffered in the second buffer, the corresponding second video data is obtained from the second buffer and played. Otherwise, in order to avoid the video stuttering phenomenon, then whether the first video data corresponding to the current video data is buffered in the first buffer can be determined, and if the first video data corresponding to the current video data is buffered in the first buffer, the corresponding first video data is obtained from the first buffer and played; on this basis, otherwise, it indicates that the current video data is the target video data that has not been downloaded yet, and the video stuttering phenomenon may occur at this time. In the above-mentioned embodiment, the video-viewing users can be ensured to watch the video data with high video quality to the greatest extent firstly, and then the video stuttering phenomenon can be avoided, thereby improving the viewing experience of the video-viewing user for the panoramic video.

Figure 3A:
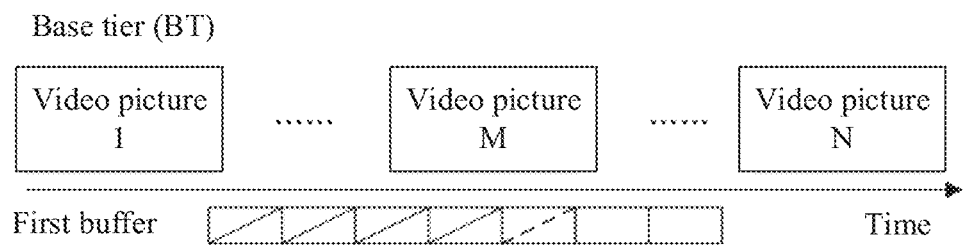
FIG. 3A is a downloading schematic diagram of a base tier in a method of video downloading in the first embodiment of the present disclosure.
Figure 3B:
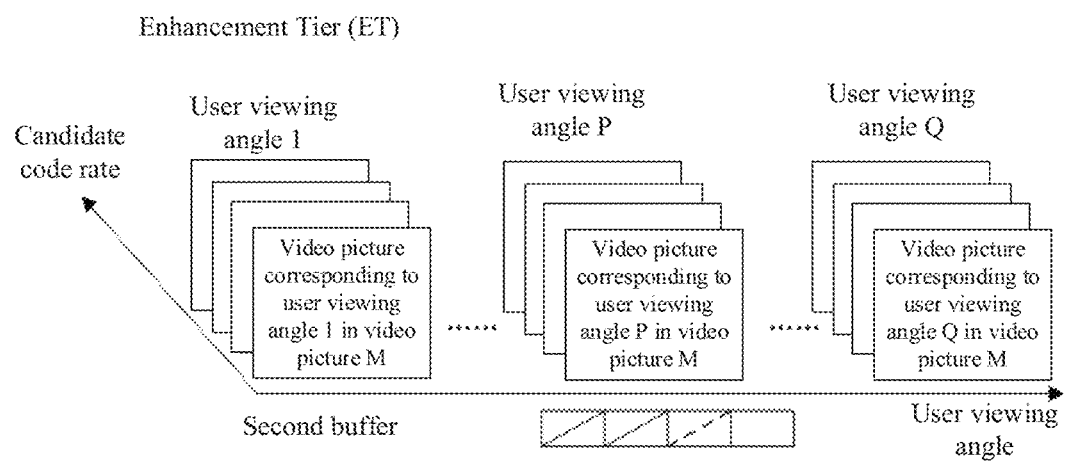
FIG. 3B is a downloading schematic diagram of an enhancement tier in a method of video downloading in the first embodiment of the present disclosure.

In order to better understand the above-mentioned embodiment as a whole, the following illustrated the above-mentioned embodiment with examples. For example, referring to FIG. 3A, a panoramic video includes N frames of video pictures downloaded in sequence, and the first video data corresponding to a downloaded video picture is buffered in the first buffer, wherein the solid diagonal line represents that the first video data that is in a buffered state at the current moment, and the dashed diagonal line represents the first video data that is buffered currently. The length of the first buffer can be understood as the first target buffer length. Referring to FIG. 3B, which takes the M-th video picture in a panoramic video as an example and shows the video pictures corresponding to different user viewing angles in the video picture M, the video pictures in each user viewing angle corresponds to a plurality of candidate code rates. The second buffer is similar to the first buffer, and will not be repeated here. Therefore, when downloading the second video data, according to the user viewing angle and network bandwidth obtained by predicting, the second video data corresponding to a video picture of what candidate code rate under what user viewing angle can be determined to download.

Embodiment 2

Figure 4:
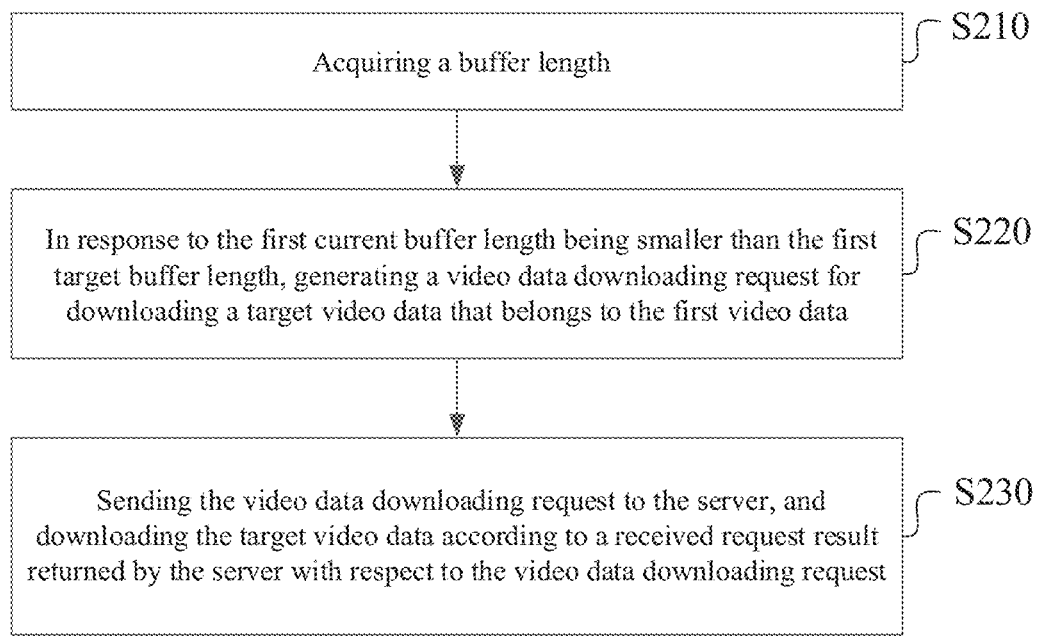
FIG. 4 is a flowchart of a method of video downloading in the second embodiment of the present disclosure.

FIG. 4 is a flowchart of a method of video downloading in the second embodiment of the present disclosure. The present embodiment takes the examples in the above-mentioned embodiment as the basis to adjust. In the present embodiment, in an example, the buffer length includes the first current buffer length and the first target buffer length. The generating a video data downloading request according to the buffer length includes: in response to the first current buffer length being smaller than the first target buffer length, generating a video data downloading request for downloading the target video data that belongs to the first video data. The explanations of terms that are the same as or corresponding to the above-mentioned embodiments are not repeated here.

Correspondingly, as illustrated in FIG. 4, the method of the present embodiment may include the following steps:

- S210: acquiring a buffer length. The buffering length includes the first current buffering length and the first target buffering length of the first video data corresponding to a target viewing angle in a panoramic video.
- S220: in response to the first current buffer length being smaller than the first target buffer length, generating a video data downloading request for downloading a target video data that belongs to the first video data. The target video data is the video data in the panoramic video stored in a server.

Because the first current buffer length may be the actual length of the first video data that is in a buffered state at the current moment, and the first target buffer length may be the target length of the first video data that is in the buffered state, i.e., the length that can avoid the stuttering phenomenon in the process of playing the first video data, when the first current buffer length is smaller than the first target buffer length, it indicates that the video stuttering phenomenon may occur at this time. Compared with the video quality, the video stuttering will affect the viewing experience of a video-viewing user. Therefore, when the first current buffer length is smaller than the first target buffer length, a video data downloading request for downloading a target video data that belongs to the first video data can be generated. The target video data can be understood as the first video data that has a downloading requirement (i.e., is adjacent in the playback time to the first video data that has been buffered currently and has not been buffered) at the current moment, so as to ensure the smooth playback of a panoramic video by downloading the first video data with a sufficient length.

- S230: sending the video data downloading request to the server, and downloading the target video data according to a received request result returned by the server with respect to the video data downloading request.

In the embodiment of the present disclosure, whether the first video data currently in a buffered state can ensure the smooth playback of a panoramic video is determined by judging whether the first current buffer length is smaller than the first target buffer length. If not, then a video data downloading request for downloading the target video data that belongs to the first video data can be generated, which is cooperated with the subsequent steps. Thus, the smooth playback of the panoramic video can be ensured by downloading the first video data with a sufficient length.

In an embodiment, on the basis of the second embodiment, the buffer length may further include the second current buffer length and the second target buffer length of the second video data corresponding to the user viewing angle in the panoramic video. The user viewing angle includes the viewing angle of a video-viewing user of the panoramic video. The coverage area of the target viewing angle is greater than the coverage area of the user viewing angle. The video quality of the first video data is lower than the video quality of the second video data. After the first current buffer length is smaller than the first target buffer length, the above-mentioned method of video downloading may further include: if the first current buffer length is greater than or equal to the first target buffer length, determining whether the second current buffer length is smaller than the second target buffer length; and if the second current buffer length is smaller than the second target buffer length, generating a video data downloading request for downloading the target video data that belongs to the second video data.

When the first current buffer length is greater than or equal to the first target buffer length, it indicates that the smooth playback of the panoramic video can be ensured at this time. Then, in order to improve the viewing experience of a video-viewing user, whether the second current buffer length is smaller than the second target buffer length can be judged again. If yes, it indicates that it cannot ensure that the video-viewing user can watch video data with high video quality at this time, then the video data downloading request for downloading the target video data that belongs to the second video data is generated. The target video data can be understood as the second video data that has a downloading requirement (i.e., is adjacent in the playback time to the second video data that has been buffered currently and has not been buffered) at the current moment, which is cooperated with the subsequent steps, and thus ensures that the video-viewing user can watch video data with high video quality by downloading the second video data with a sufficient length On this basis, in an embodiment, the user viewing angle corresponding to the second video data that is buffered currently is the predicted viewing angle of the video-viewing user in the playback time of the second video data that is buffered currently, then after determining whether the second current buffer length is smaller than the second target buffer length, the above-mentioned method of video downloading may further include: if the second current buffer length is greater than or equal to the second target buffer length, then predicting the user viewing angle of the video-viewing user in the playback time again, and determining the third video data that corresponds to the user viewing angle predicted again and the playback time and have the same video quality as the second video data in panoramic video; if the third video data includes fourth video data except for the second video data that is buffered currently, then generating a video data downloading request for downloading the target video data obtained on the basis of the fourth video data; and if the third video data do not include the fourth video data, then determining the fifth video data that has the same video quality as the second video data that is buffered currently and are adjacent in a spatial position to the second video data that is buffered currently in the panoramic video, and generating a video data downloading request for downloading the target video data obtained on the basis of the fifth video data.

When the second current buffer length is greater than or equal to the second target buffer length, it indicates that the second video data that is buffered currently (i.e., has been buffered and not played at the current moment) can basically ensure the video-viewing user to watch the video data with high video quality. However, considering that the user viewing angle corresponding to the second video data that is buffered currently is the predicted viewing angle of the video-viewing user in the playback time of the second video data that is buffered currently, there may be a situation that the prediction is wrong. Therefore, in order to improve the viewing experience of the video-viewing user, the user viewing angle of the video-viewing user in the playback time can be predicted again, and the third video data can be determined. The third video data may be video data that correspond to the playback time and the user viewing angle predicted again, and have the same video quality as the second video data in panoramic video.

If the third video data includes the fourth video data except for the second video data that is buffered currently, it indicates that the user viewing angle predicted previously in the playback time has an offset, and the fourth video data is the video data corresponding to the part of the user viewing angles unpredicted previously, so the video data downloading request for downloading the target video data obtained on the basis of the fourth video data can be generated, which is cooperated with the subsequent steps, so as to ensure that the video-viewing user can watch the video data with high video quality in the playback time to the greatest extent by the more accurate user viewing angle predicted again. The above-mentioned target video data may be the fourth video data, the fourth video data plus the video data except for the second video data that is buffered currently extended outward from the center of the fourth video data, etc., which is not specifically limited here.

If the third video data do not include the fourth video data, it indicates that the previously predicted user viewing angle in the playback time is accurate. On this basis, considering that the video-viewing user may suddenly change his own user viewing angle in playback time, in order to have certain fault tolerance (i.e., to allow the video-viewing user to watch the video data with high video quality in various situations), the fifth video data that has the same video quality as the second video data that is buffered currently and are adjacent in the spatial position to the second video data that is buffered currently in the panoramic video can be determined, i.e., the fifth video data may be the video data that is peripheral to the second video data and has good video quality, and then the video data downloading request for downloading the target video data obtained on the basis of the fifth video data is generated, which is cooperated with the subsequent steps, and thus, the robustness of the video-viewing user watching the video data with high video quality can be improved by downloading the target video data beyond the user viewing angle. The above-mentioned target video data may be the fifth video data, the fifth video data plus the video data extended outward from the center of the fifth video data, etc., which is not specifically limited here.

Figure 5:
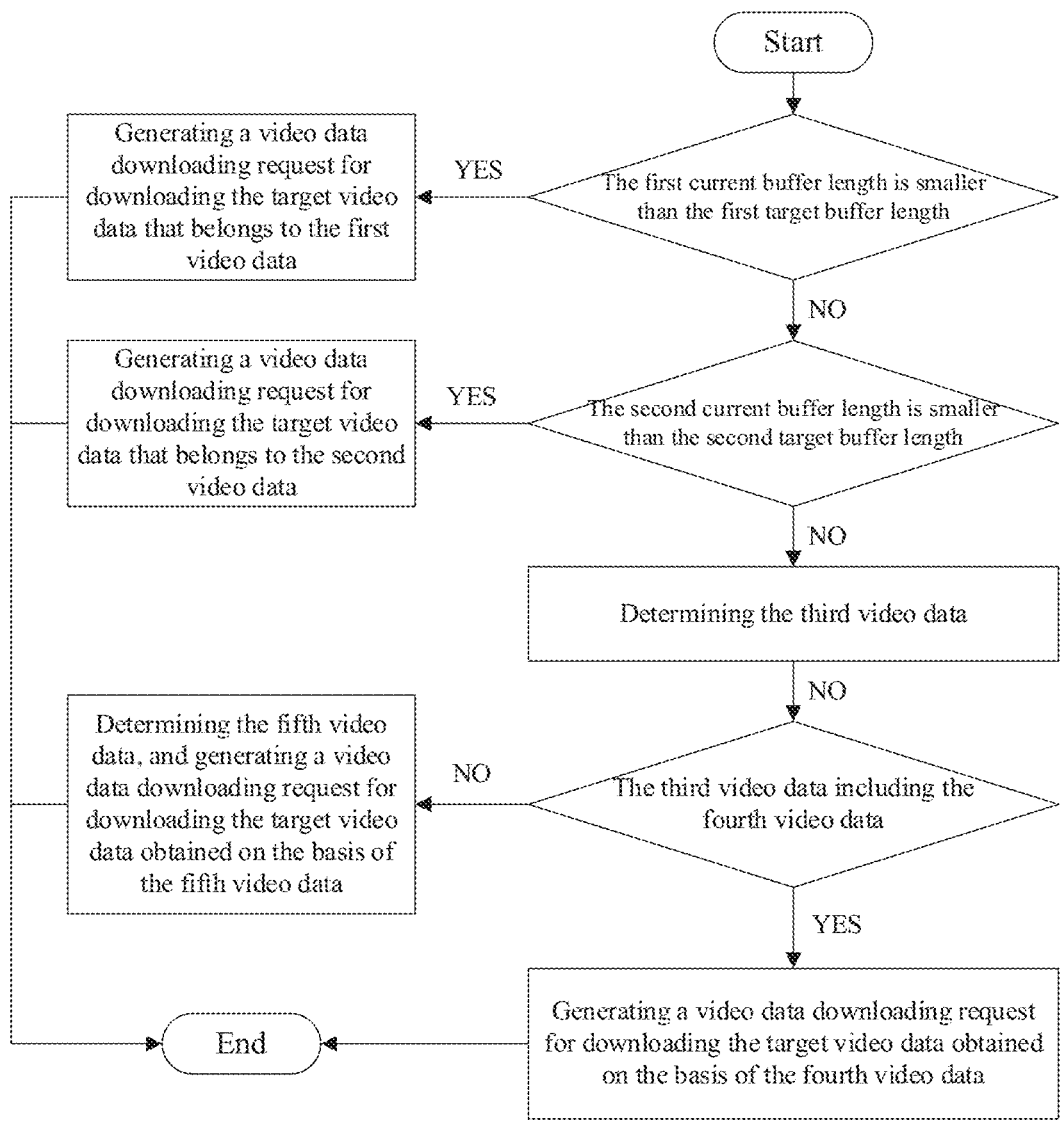
FIG. 5 is a flowchart of the first example in a method of video downloading in the second embodiment of the present disclosure.

In order to better understand the various judgment branches in the above-mentioned embodiments as a whole, the following illustrates the various judgment branches with examples. For example, as illustrated in FIG. 5, whether the first current buffer length is smaller than the first target buffer length is judged, if yes, then a video data downloading request for downloading the target video data that belongs to the first video data is generated (end), otherwise, whether the second current buffer length is smaller than the second target buffer length is judged, and then the following steps are executed according to the judgment result; if yes, a video data downloading request for downloading the target video data that belongs to the second video data is generated (end), otherwise the third video data is determined and the following steps continue to be executed; whether the third video data includes the fourth video data is judged, if yes, then a video data downloading request for downloading the target video data obtained on the basis of the fourth video data is generated (end), otherwise, the fifth video data is determined and a video data downloading request for downloading the target video data obtained on the basis of the fifth video data is generated (end). Various judgment branches cooperate with each other, which can not only avoid the situation of video stuttering, but also ensure that the video-viewing user can watch the video data with high video quality in the playback time to the greatest extent.

Figure 6:
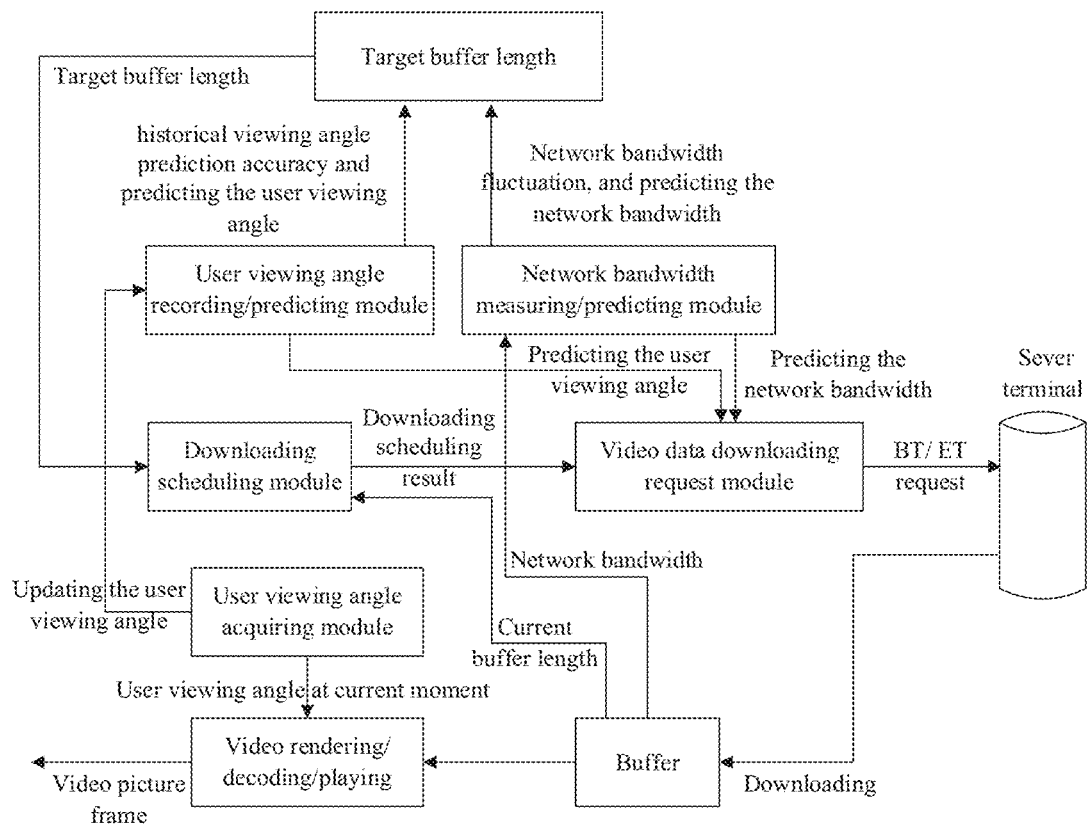
FIG. 6 is a flowchart of the second example in a method of video downloading in the second embodiment of the present disclosure.

In order to better understand the above-mentioned embodiments as a whole, the following illustrates the above-mentioned embodiments with examples. For example, as illustrated in FIG. 6, the historical viewing angle prediction accuracy sent by a user viewing angle recording/predicting module and the network bandwidth sent by a network bandwidth measuring/predicting module are received by a target buffer length controlling module, and then the first target buffer length and the second target buffer length are determined. The network bandwidth can be predicted by the network bandwidth measuring/predicting module according to historical bandwidth information and historical bandwidth prediction accuracy, the historical bandwidth information and historical bandwidth prediction accuracy can be determined by the network bandwidth sent in real time/regularly by the buffer, and the historical bandwidth information can be represented by the network bandwidth fluctuation that has occurred. The historical viewing angle prediction accuracy can be determined by a user viewing angle recording/predicting module according to the user viewing angle sent in real time/regularly by a user viewing angle acquiring module, which can also be used to predict the user viewing angle in the future period accordingly. After receiving the first target buffer length and second target buffer length sent by a target buffer length controlling module, and the first current buffer length and second current buffer length sent by a buffer, a downloading scheduling module can determine whether the target video data to be downloaded is associated with the first video data or the second video data (i.e., the downloading scheduling result), and send the downloading scheduling result to a video data downloading request module, so that video the data downloading request module generates a video data downloading request according to the downloading scheduling result, the user viewing angle predicted by the user viewing angle recording/predicting module and the network bandwidth predicted by the network bandwidth measuring/predicting module, and sends the generated result to a server, thereby requesting (i.e. downloading) the target video data that is associated with the first video data and/or the second video data, corresponds to the target code rate matched with the predicted network bandwidth and corresponds to the predicted user viewing angle from the server. The target video data downloaded is buffered in the buffer, so as to acquire the current video data from the buffer according to the user viewing angle in the current moment that is acquired by the user viewing angle acquiring module, and perform video rendering/decoding/playing and other operations, thereby implementing the playback of the panoramic video.

Embodiment 3

Figure 7:
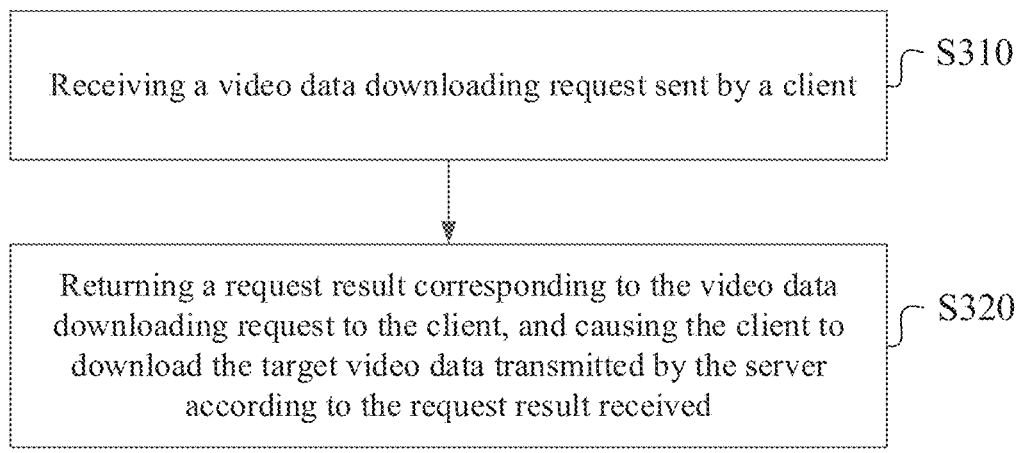
FIG. 7 is a flowchart of a method of video transmission in the third embodiment of the present disclosure.

FIG. 7 is a flowchart of a method of video transmission in the third embodiment of the present disclosure. In the present embodiment, a panoramic video can be transmitted, and a panoramic video that can not only ensure the video quality of video data watched by a user, but also ensure that there is no video data missing can also be transmitted. The method can be executed by a video transmission apparatus provided by the embodiments of the present disclosure, the apparatus can be implemented by software and/or hardware, and the apparatus can be integrated on a server, and the server stores the panoramic video. The explanations of terms that are the same as or corresponding to the above-mentioned embodiments are not repeated here.

Correspondingly, as illustrated in FIG. 7, the method of the present embodiment may include the following steps:

S310: receiving a video data downloading request sent by a client. The video data downloading request is a request for downloading target video data in a panoramic video generated according to a buffer length. The target video data is associated with the first video data and/or the second video data. The buffering length includes at least one selected from the group consisting of: in a panoramic video, the first current buffering length and first target buffering length of the first video data corresponding to a target viewing angle, and the second current buffering length and second target buffering length of the second video data corresponding to a user viewing angle. The user viewing angle is the viewing angle of a video-viewing user of the panoramic video. The coverage area of the target viewing angle is greater than the coverage area of the user viewing angle. The video quality of the first video data is lower than the video quality of the second video data.

S320: returning a request result corresponding to the video data downloading request to the client, and causing the client to download the target video data transmitted by the server according to the request result received.

In practical applications, in an embodiment, when the target viewing angle is a complete viewing angle, for the target video data associated with the first video data, all the video data of the video picture of the frame can be taken as the target video data, and the target video data can be encoded as a whole, and then the encoding result is transmitted. For the target video data associated with the second video data, the video picture of the frame can also be divided into several blocks, the video data of the block where the target video data is positioned are encoded, and then the encoding result is transmitted. That is, the target video data associated with the first video data and the target video data associated with the second video data can be independently encoded, and the both can also perform dependency encoding, which will be introduced later.

In the embodiment of the present disclosure, a video data downloading request sent by a client is received. The video data downloading request may be a request for downloading the target video data in a panoramic video stored in a server according to a buffer length. The target video data may include video data associated with the first video data and/or second video data corresponding to the buffer length. Then the request result corresponding to the video data downloading request is returned to the client, so as to cause the client to download the target video data transmitted by the server according to the request result received. The above-mentioned embodiment can improve the viewing experience of the video-viewing user for the panoramic video.

In an embodiment, on the basis of the third embodiment, the above-mentioned method of video transmission may further include: for original video data in the panoramic video that is not encoded, segmenting the original video data in space to obtain original video sub-data; for target video sub-data corresponding to the target viewing angle and user video sub-data corresponding to the user viewing angle in the original video sub-data, encoding and updating the target video sub-data based on the first preset code rate, and using a method of scalable video coding to encode and update the user video sub-data based on the second preset rate; wherein the returning a request result corresponding to the video data downloading request to the client includes: determining the request result corresponding to the video data downloading request according to the target video sub-data and/or the user video sub-data, and returning the request result to the client; wherein the target video data downloaded by the client includes the target video sub-data and/or the user video sub-data, and after the causing the client to download the target video data transmitted by the server according to the request result received, the method further includes: combining the target video sub-data and the user video sub-data that are downloaded and are overlapped in spatial positions, and updating the target video sub-data that is combined based on a combination result.

The original video data may be the video data of the video picture of a certain frame in the panoramic video that are not encoded, and the original video data is segmented in space to obtain the original video sub-data. For example, referring to FIG. 1, in which the video data corresponding to each small block is an original video sub-data. For at least one target video sub-data corresponding to the target viewing angle in various original video sub-data, each target video sub-data can be encoded respectively based on the first preset code rate, and then the target video sub-data can be updated according to the encoding result and be transmitted to the client respectively. For at least one user video sub-data corresponding to the user viewing angle in various original video sub-data, the method of scalable video coding (svc) can be used to encode the user video sub-data respectively based on the second preset code rate, and then the user video sub-data is updated according to the encoding results and is transmitted to the client respectively. In this way, the client can combine the target video sub-data and the user video sub-data that are overlapped in space (i.e., corresponding to the same original video sub-data), and thus the target video sub-data corresponding to a higher code rate is obtained. For example, assuming that the first preset code rate is 100 and the second preset code rate is 400, the target video sub-data corresponding to 500 (100+400) can be obtained after combination. For the method of encoding and transmitting the target video sub-data and the user video sub-data independently, taking the encoding based on 100 and 500 as an example, the user video sub-data of 100 will be covered under the target video sub-data of 500, which has a bandwidth waste. Correspondingly, the above-mentioned embodiment uses the method of dependency coding, both the target video sub-data and the user video sub-data transmitted by the server can be applied effectively, thereby improving the bandwidth utilization rate.

Embodiment 4

Figure 8:
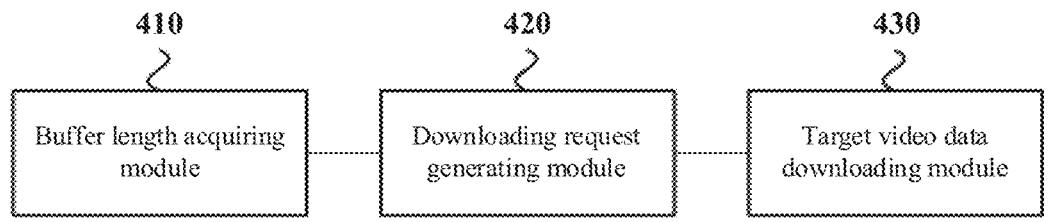
FIG. 8 is a structural block diagram of a video downloading apparatus in the fourth embodiment of the present disclosure.

FIG. 8 is a structural block diagram of a video downloading apparatus in the fourth embodiment of the present disclosure. The apparatus and the method of video downloading in the above-mentioned embodiments belong to the same conception, and the details that are not described in detail in the embodiments of the video downloading apparatus can be referred to the above-mentioned embodiments of the method of video downloading. Referring to FIG. 8, the apparatus can be configured at the client, and the apparatus may include a buffer length acquiring module 410, a downloading request generating module 420 and a target video data downloading module 430.

The buffer length acquiring module 410 is configured to acquire a buffer length. The buffer length includes at least one selected from the group consisting of: in a panoramic video, the first current buffer length and the first target buffer length of first video data corresponding to a target viewing angle, and the second current buffer length and the second target buffer length of second video data corresponding to a user viewing angle. The user viewing angle includes a viewing angle of a video-viewing user of the panoramic video. A coverage area of the target viewing angle is greater than a coverage area of the user viewing angle. A video quality of the first video data is lower than a video quality of the second video data.

The downloading request generating module 420 is configured to generate a video data downloading request according to the buffer length. The video data downloading request includes a request for downloading target video data in the panoramic video stored in a server, and the target video data is associated with the first video data and/or the second video data.

The target video data downloading module 430 is configured to send the video data downloading request to the server, and download the target video data according to a received request result returned by the server with respect to the video data downloading request.

The video download apparatus provided by the fourth embodiment of the present disclosure, through the buffer length acquiring module and the downloading request generating module cooperating with each other, acquires a buffer length and generates a video data downloading request for downloading target video data in the panoramic video stored in the server according to the buffer length, and the target video data may include video data associated with the first video data and/or the second video data corresponding to the buffer length. Further, the video download apparatus sends the video data downloading request to a server through the target video data downloading module, and downloads the target video data according to the received request result returned by the server with respect to the video data downloading request. The above-mentioned apparatus improves the viewing experience of a video-viewing user for the panoramic video.

The video downloading apparatus provided by the embodiment of the present disclosure can execute the method of video downloading provided by any embodiment of the present disclosure, and has functional modules and beneficial effects corresponding to executing the method.

It is worth noting that, in the above-mentioned embodiment of the video downloading apparatus, units and modules included are only divided according to the functional logic, but are not limited to the above-mentioned division, as long as the corresponding functions can be implemented. In addition, the specific names of the functional units are only for the convenience of distinguishing each other, and are not used to limit the protection scope of the present disclosure.

Embodiment 5

Figure 9:
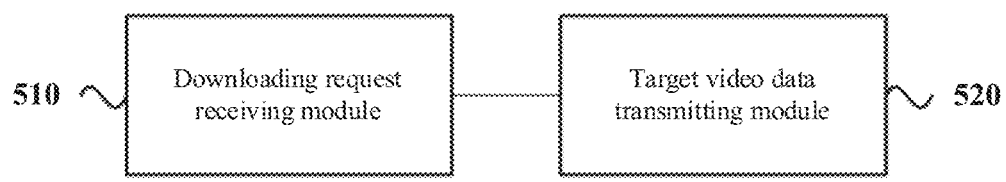
FIG. 9 is a structural block diagram of a video transmission apparatus in the fifth embodiment of the present disclosure.

FIG. 9 is a structural block diagram of a video transmission apparatus in the fifth embodiment of the present disclosure, and the apparatus is used to execute the method of video transmission provided by any embodiment mentioned above. The apparatus and the method of video transmissions of the above-mentioned embodiments belong to the same conception, and the details that are not described in detail in the embodiments of the video transmission apparatus can be referred to the embodiments of the above-mentioned method of video transmission. Referring to FIG. 9, the apparatus can be configured in a server storing a panoramic video, and the apparatus may include a downloading request receiving module 510 and a target video data transmitting module 520.

The downloading request receiving module 510 is configured to receive a video data downloading request sent by a client. The video data downloading request includes a request for downloading target video data in the panoramic video generated according to a buffer length, and the target video data is associated with the first video data and/or the second video data.

The target video data transmitting module 520 is configured to return a request result corresponding to the video data downloading request to the client, and cause the client to download the target video data transmitted by the server according to the request result received.

The buffer length includes at least one selected from the group consisting of: in a panoramic video, the first current buffer length and the first target buffer length of the first video data corresponding to a target viewing angle, and the second current buffer length and the second target buffer length of the second video data corresponding to a user viewing angle. The user viewing angle includes a viewing angle of a video-viewing user of the panoramic video. A coverage area of the target viewing angle is greater than a coverage area of the user viewing angle, and a video quality of the first video data is lower than a video quality of the second video data.

The video transmission apparatus provided by the fifth embodiment of the present disclosure receives a video data downloading request sent by a client through a downloading request receiving module. The video data downloading request may be a request for downloading target video data in a panoramic video stored in a server according to a buffer length, and the target video data may include video data associated with the first video data and/or the second video data corresponding to the buffer length. Then, the video transmission apparatus returns the request result corresponding to the video data downloading request to the client through the target video data transmitting module, and causes the client to download the target video data transmitted by the server according to the request result received. The above-mentioned apparatus improves the viewing experience of the video-viewing user for the panoramic video.

The video transmission apparatus provided by the embodiment of the present disclosure can execute the method of video transmission provided by any embodiment of the present disclosure, and has functional modules and beneficial effects corresponding to executing the method.

It is worth noting that, in the above-mentioned embodiment of the video transmission apparatus, units and modules included are only divided according to the functional logic, but are not limited to the above-mentioned division, as long as the corresponding functions can be implemented. In addition, the specific names of the functional units are only for the convenience of distinguishing each other, and are not used to limit the protection scope of the present disclosure.

Embodiment 6

Figure 10:
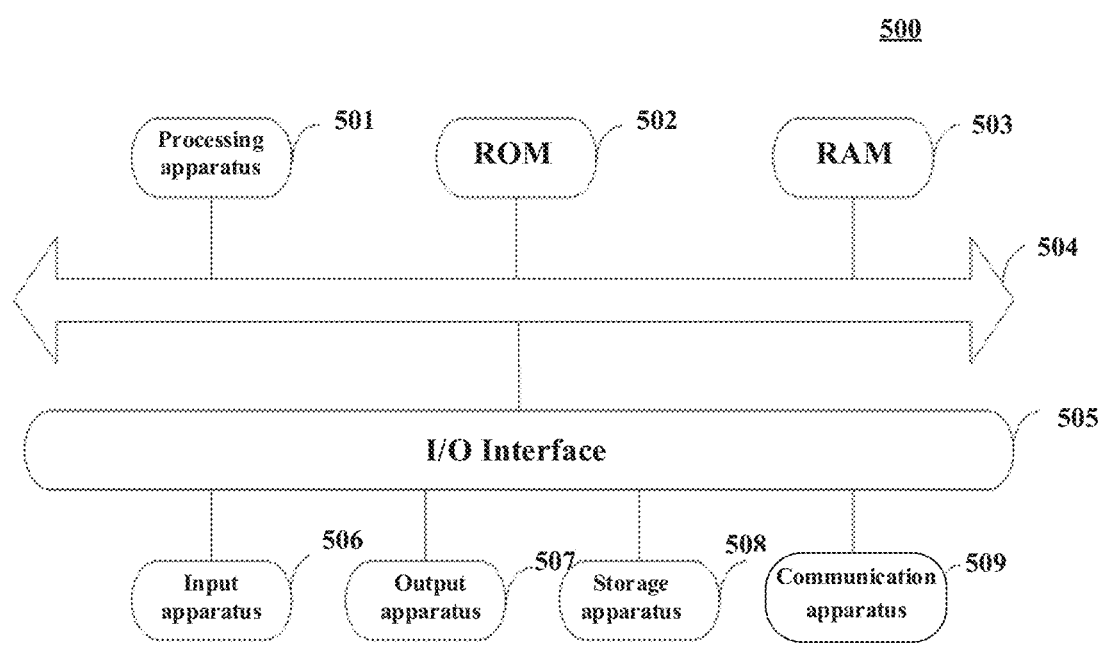
FIG. 10 is a structural schematic diagram of an electronic device in the sixth embodiment of the present disclosure.

Referring to FIG. 10, FIG. 10 illustrates a structural schematic diagram of an electronic device 500 (e.g., a terminal device or a server in FIG. 10) that is suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal) or the like, and fixed terminals such as a digital TV, a desktop computer or the like. The electronic device illustrated in FIG. 10. is merely an example, and should not pose any limitation to the functions and the range of use of the embodiments of the present disclosure.

As illustrated in FIG. 10, an electronic device 500 may include a processing apparatus 501 (e.g., a central processing unit, a graphics processing unit, etc.), which can perform various suitable actions and processing according to a program stored in a read-only memory (ROM) 502 or a program loaded from a storage apparatus 508 into a random-access memory (RAM) 503. The RAM 503 further stores various programs and data required for operations of the electronic device 500. The processing apparatus 501, the ROM 502, and the RAM 503 are interconnected by means of a bus 504. An input/output (I/O) interface 505 is also connected to the bus 504.

Usually, the following apparatus may be connected to the I/O interface 505: an input apparatus 506 including, for example, a touch screen, a touch pad, a keyboard, a mouse, a camera, a microphone, an accelerometer, a gyroscope, or the like; an output apparatus 507 including, for example, a liquid crystal display (LCD), a loudspeaker, a vibrator, or the like; a storage apparatus 508 including, for example, a magnetic tape, a hard disk, or the like; and a communication apparatus 509. The communication apparatus 509 may allow the electronic device 500 to be in wireless or wired communication with other devices to exchange data. While FIG. 5 illustrates the electronic device 500 having various apparatuses, it should be understood that not all of the illustrated apparatuses are necessarily implemented or included. More or fewer apparatuses may be implemented or included alternatively.

Embodiment 7

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 509 and installed, or may be installed from the storage apparatus 508, or may be installed from the ROM 502. When the computer program is executed by the processing apparatus 501, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to:

acquire a buffer length, wherein the buffer length includes at least one selected from the group consisting of: in a panoramic video, the first current buffer length and the first target buffer length of the first video data corresponding to a target viewing angle, and the second current buffer length and the second target buffer length of the second video data corresponding to a user viewing angle, the user viewing angle includes a viewing angle of a video-viewing user of the panoramic video, a coverage area of the target viewing angle is greater than a coverage area of the user viewing angle, and a video quality of the first video data is lower than a video quality of the second video data;

generate a video data downloading request according to the buffer length, wherein the video data downloading request is a request for downloading target video data in the panoramic video stored in a server, and the target video data is associated with the first video data and/or the second video data; and send the video data downloading request to the server, and download the target video data according to a received request result returned by the server with respect to the video data downloading request.

Alternatively, the above-mentioned computer-readable medium carries one or more programs, and when the one or more programs are executed by the electronic device, the electronic device is caused to:

receive a video data downloading request sent by a client, wherein the video data downloading request includes a request for downloading target video data in the panoramic video generated according to a buffer length, and the target video data is associated with at least one selected from the group consisting of first video data or second video data;

return a request result corresponding to the video data downloading request to the client, and cause the client to download the target video data transmitted by the server according to the request result received;

wherein the buffer length includes at least one selected from the group consisting of: in a panoramic video, the first current buffer length and the first target buffer length of the first video data corresponding to a target viewing angle, and the second current buffer length and the second target buffer length of the second video data corresponding to a user viewing angle, the user viewing angle includes a viewing angle of a video-viewing user of the panoramic video, a coverage area of the target viewing angle is greater than a coverage area of the user viewing angle, and a video quality of the first video data is lower than a video quality of the second video data.

The storage medium may be a non-transitory storage medium.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The involved units described in the embodiments of the present disclosure may be achieved by a mode of software, or may be achieved by a mode of hardware. Herein, the name of the unit does not constitute a limitation for the unit itself in some cases. For example, a target video data downloading module can also be described as "a module that sends the video data downloading request to the server, and downloads the target video data according to a received request result returned by the server with respect to the video data downloading request".

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, [Example 1] provides a method of video downloading, which is applied to a client and may include:

acquiring a buffer length, wherein the buffer length includes at least one selected from the group consisting of: in a panoramic video, the first current buffer length and the first target buffer length of the first video data corresponding to a target viewing angle, and the second current buffer length and the second target buffer length of the second video data corresponding to a user viewing angle, the user viewing angle includes a viewing angle of a video-viewing user of the panoramic video, a coverage area of the target viewing angle is greater than a coverage area of the user viewing angle, and a video quality of the first video data is lower than a video quality of the second video data;

generating a video data downloading request according to the buffer length, wherein the video data downloading request is a request for downloading target video data in the panoramic video stored in a server, and the target video data is associated with the first video data and/or the second video data; and sending the video data downloading request to the server, and downloading the target video data according to a received request result returned by the server with respect to the video data downloading request.

According to one or more embodiments of the present disclosure, [Example 2] provides the method of Example 1, the buffer length includes the first current buffer length and the first target buffer length; and the generating a video data downloading request according to the buffer length, may include:

in response to the first current buffer length being smaller than the first target buffer length, generating a video data downloading request for downloading the target video data that belongs to the first video data.

According to one or more embodiments of the present disclosure, [Example 3] provides the method of Example 2, the buffer length further includes the second current buffer length and the second target buffer length; and the generating a video data downloading request according to the buffer length may further include:

in response to the first current buffer length being greater than or equal to the first target buffer length, determining whether the second current buffer length is smaller than the second target buffer length; and in response to the second current buffer length being smaller than the second target buffer length, generating a video data downloading request for downloading the target video data that belongs to the second video data.

According to one or more embodiments of the present disclosure, [Example 4] provides the method of Example 3, the user viewing angle corresponding to the second video data that is buffered currently is a predicted viewing angle of the video-viewing user in playback time of the second video data that is buffered currently, and after the determining whether the second current buffer length is smaller than the second target buffer length, the above-mentioned method of video downloading may further include:

in response to the second current buffer length being greater than or equal to the second target buffer length, predicting the user viewing angle of the video-viewing user in the playback time again, and determining the third video data in the panoramic video that corresponds to the user viewing angle predicted again and the playback time, and has the same video quality as the second video data;

in response to the third video data including the fourth video data except for the second video data that is buffered currently, generating a video data downloading request for downloading the target video data obtained on a basis of the fourth video data; and in response to the third video data not including the fourth video data, determining the fifth video data in the panoramic video that has the same video quality as the second video data that is buffered currently and is adjacent in a spatial position to the second video data that is buffered currently, and generating a video data downloading request for downloading the target video data obtained on a basis of the fifth video data.

According to one or more embodiments of the present disclosure, [Example 5] provides the method of Example 1, and the above-mentioned method of video downloading may further include:

acquiring historical bandwidth information and historical bandwidth prediction accuracy, predicting a network bandwidth when downloading the target video data according to the historical bandwidth information and the historical bandwidth prediction accuracy, and determining the first target buffer length according to the network bandwidth;

and/or, when the user viewing angle is a predicted viewing angle of the video-viewing user when watching the second video data to be buffered, acquiring historical viewing angle prediction accuracy, and determining the second target buffer length according to the historical viewing angle prediction accuracy and the network bandwidth.

According to one or more embodiments of the present disclosure, [Example 6] provides the method of Example 1, the generating a video data downloading request according to the buffer length may include:

predicting a network bandwidth when downloading the target video data; and generating the video data downloading request according to the buffer length and the network bandwidth, wherein a target code rate of the target video data represented by the video data downloading request is related to the network bandwidth.

According to one or more embodiments of the present disclosure, [Example 7] provides the method of Example 1, a buffer is set in a terminal device configured with the client, and the buffer includes the first buffer for buffering the first video data downloaded and the second buffer for buffering the second video data downloaded;

after downloading the target video data, the method of video downloading may further include:

buffering the target video data into a buffer associated with the target video data;

when playing current video data in the panoramic video, in response to the second video data corresponding to the current video data being buffered in the second buffer, acquiring and playing the corresponding second video data from the second buffer;

in response to the second video data corresponding to the current video data being not buffered in the second buffer, determining whether first video data corresponding to the current video data is buffered in the first buffer; and in response to the first video data corresponding to the current video data being buffered in the first buffer, acquiring and playing the first video data corresponding to the current video data from the first buffer.

According to one or more embodiments of the present disclosure, [Example 8] provides a method of video transmission, which is applied to a server storing a panoramic video and may include:

receiving a video data downloading request sent by a client, wherein the video data downloading request includes a request for downloading target video data in the panoramic video generated according to a buffer length, and the target video data is associated with the first video data and/or the second video data;

returning a request result corresponding to the video data downloading request to the client, and causing the client to download the target video data transmitted by the server according to the request result received;

wherein the buffer length includes at least one selected from the group consisting of: in a panoramic video, the first current buffer length and the first target buffer length of the first video data corresponding to a target viewing angle, and the second current buffer length and the second target buffer length of the second video data corresponding to a user viewing angle, the user viewing angle includes a viewing angle of a video-viewing user of the panoramic video, a coverage area of the target viewing angle is greater than a coverage area of the user viewing angle, and a video quality of the first video data is lower than a video quality of the second video data.

According to one or more embodiments of the present disclosure, [Example 9] provides the method of Example 8, and the above method of video transmission may further include:
- for original video data in the panoramic video that is not encoded, segmenting the original video data in space to obtain original video sub-data;
- for target video sub-data corresponding to the target viewing angle and user video sub-data corresponding to the user viewing angle in the original video sub-data, encoding and updating the target video sub-data based on the first preset code rate, and using a method of scalable video coding to encode and update the user video sub-data based on the second preset rate;
- wherein the returning a request result corresponding to the video data downloading request to the client may include:
- determining the request result corresponding to the video data downloading request according to the target video sub-data and/or the user video sub-data, and returning the request result to the client;
- wherein the target video data downloaded by the client includes the target video sub-data and/or the user video sub-data, and after the causing the client to download the target video data transmitted by the server according to the request result received, the method may further include:
- combining the target video sub-data and the user video sub-data that are downloaded and are overlapped in spatial positions, and updating the target video sub-data that is combined based on a combination result.

According to one or more embodiments of the present disclosure, [Example 10] provides a video downloading apparatus, which is configured at a client and may include a buffer length acquiring module, a downloading request generating module and a target video data downloading module.

The buffer length acquiring module is configured to acquire a buffer length, wherein the buffer length includes at least one selected from the group consisting of: in a panoramic video, the first current buffer length and the first target buffer length of the first video data corresponding to a target viewing angle, and the second current buffer length and the second target buffer length of the second video data corresponding to a user viewing angle, the user viewing angle includes a viewing angle of a video-viewing user of the panoramic video, a coverage area of the target viewing angle is greater than a coverage area of the user viewing angle, and a video quality of the first video data is lower than a video quality of the second video data.

The downloading request generating module is configured to generate a video data downloading request according to the buffer length, wherein the video data downloading request includes a request for downloading target video data in the panoramic video stored in a server, and the target video data is associated with the first video data and/or the second video data.

The target video data downloading module is configured to send the video data downloading request to the server, and download the target video data according to a received request result returned by the server with respect to the video data downloading request.

According to one or more embodiments of the present disclosure, [Example 11] provides the apparatus of Example 10, the buffer length includes the first current buffer length and the first target buffer length; and the downloading request generating module may include the first download request generating unit.

The first download request generating unit is configured to, in response to the first current buffer length being smaller than the first target buffer length, generate a video data downloading request for downloading the target video data that belongs to the first video data.

According to one or more embodiments of the present disclosure, [Example 12] provides the apparatus of Example 11, the buffer length further includes the second current buffer length and the second target buffer length; and the downloading request generating module may further include the second current buffer length judging unit and a downloading request second generating module.

The second current buffer length judging unit is configured to, in response to the first current buffer length being greater than or equal to the first target buffer length, determine whether the second current buffer length is smaller than the second target buffer length.

The downloading request second generating module is configured to, in response to the second current buffer length being smaller than the second target buffer length, generate a video data downloading request for downloading the target video data that belongs to the second video data.

According to one or more embodiments of the present disclosure, [Example 13] provides the apparatus of Example 12, the user viewing angle corresponding to the second video data that is buffered currently is a predicted viewing angle of the video-viewing user in playback time of the second video data that is buffered currently; and the downloading request generating module may further include the third video data determining unit, a downloading request third generating unit and a downloading request fourth generating unit.

The third video data determining unit is configured to, after determining whether the second current buffer length is smaller than the second target buffer length, in response to the second current buffer length being greater than or equal to the second target buffer length, predict the user viewing angle of the video-viewing user in the playback time again, and determine the third video data in the panoramic video that corresponds to the user viewing angle predicted again and the playback time and has the same video quality as the second video data.

The downloading request third generating unit is configured to, in response to the third video data including the fourth video data except for the second video data that is buffered currently, generate a video data downloading request for downloading the target video data obtained on a basis of the fourth video data.

The downloading request fourth generating unit is configured to, in response to the third video data not including the fourth video data, determine the fifth video data in the panoramic video that has the same video quality as the second video data that is buffered currently and is adjacent in a spatial position to the second video data that is buffered currently, and generate a video data downloading request for downloading the target video data obtained on a basis of the fifth video data.

According to one or more embodiments of the present disclosure, [Example 14] provides the apparatus of Example 10, and the video downloading apparatus may further include the first target buffer length determining module and/or the second target buffer length determining module.

The first target buffer length determining module is configured to acquire historical bandwidth information and historical bandwidth prediction accuracy, predict a network bandwidth when downloading the target video data according to the historical bandwidth information and the historical bandwidth prediction accuracy, and determine the first target buffer length according to the network bandwidth.

The second target buffer length determining module is configured to, when the user viewing angle includes a predicted viewing angle of the video-viewing user when watching the second video data to be buffered, acquire historical viewing angle prediction accuracy, and determine the second target buffer length according to the historical viewing angle prediction accuracy and the network bandwidth.

According to one or more embodiments of the present disclosure, [Example 15] provides the apparatus of Example 10, and the downloading request generating module may include a network bandwidth predicting unit and a downloading request fifth generating unit.

The network bandwidth predicting unit is configured to predict a network bandwidth when downloading the target video data.

The downloading request fifth generating unit is configured to the video data downloading request according to the buffer length and the network bandwidth, wherein a target code rate of the target video data represented by the video data downloading request is related to the network bandwidth.

According to one or more embodiments of the present disclosure, [Example 16] provides the apparatus of Example 10, in which a buffer is set in a terminal device configured with the client, and the buffer includes the first buffer for buffering the first video data downloaded and the second buffer for buffering the second video data downloaded; and
the above apparatus may further include a target video data buffer module, the second video data playing module, the first buffer judging module and the first video data playing module.

The target video data buffer module is configured to the target video data into a buffer associated with the target video data after downloading the target video data.

The second video data playing module is configured to, when playing current video data in the panoramic video, in response to the second video data corresponding to the current video data being buffered in the second buffer, acquire and play the corresponding second video data from the second buffer.

The first buffer judging module is configured to, in response to the second video data corresponding to the current video data being not buffered in the second buffer, determine whether the first video data corresponding to the current video data is buffered in the first buffer.

The first video data playing module is configured to, in response to the first video data corresponding to the current video data being buffered in the first buffer, acquire and play the first video data corresponding to the current video data from the first buffer.

According to one or more embodiments of the present disclosure, [Example 17] provides a video transmission apparatus, which is applied to a server storing a panoramic video and may include a downloading request receiving module and a target video data transmitting module.

The downloading request receiving module is configured to receive a video data downloading request sent by a client, wherein the video data downloading request includes a request for downloading target video data in the panoramic video generated according to a buffer length, and the target video data is associated with the first video data and/or the second video data.

The target video data transmitting module is configured to return a request result corresponding to the video data downloading request to the client, and cause the client to download the target video data transmitted by the server according to the request result received.

The buffer length includes at least one selected from the group consisting of: in a panoramic video, the first current buffer length and the first target buffer length of the first video data corresponding to a target viewing angle, and the second current buffer length and the second target buffer length of the second video data corresponding to a user viewing angle. The user viewing angle includes a viewing angle of a video-viewing user of the panoramic video. A coverage area of the target viewing angle is greater than a coverage area of the user viewing angle, and a video quality of the first video data is lower than a video quality of the second video data.

According to one or more embodiments of the present disclosure, [Example 18] provides the apparatus of Example 17, and the above-mentioned video transmitting apparatus may further include an original video sub-data obtaining module, a video sub-data updating module and a target video data transmitting module.

The original video sub-data obtaining module is configured for original video data in the panoramic video that is not encoded, and is configured to cut the original video data in space to obtain original video sub-data.

The video sub-data updating module is configured for target video sub-data corresponding to the target viewing angle and user video sub-data corresponding to the user viewing angle in the original video sub-data, and is configured to encode and update the target video sub-data based on the first preset code rate, and use a method of scalable video coding to encode and update the user video sub-data based on the second preset rate.

The target video data transmitting module may include a request result returning unit, which is configured to determine the request result corresponding to the video data downloading request according to the target video sub-data and/or the user video sub-data, and return the request result to the client.

The target video data downloaded by the client includes the target video sub-data and/or the user video sub-data, and the target video data transmitting module may further include a video sub-data combining unit.

The video sub-data combining unit is configured to, after causing the client to download the target video data transmitted by the server according to the request result received, combine the target video sub-data and the user video sub-data that are downloaded and are overlapped in spatial positions, and update the target video sub-data that is combined based on a combination result.

It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims.

What is claimed is:

1. A method of video downloading, applied to a client, comprising:
   acquiring a buffer length, wherein the buffer length comprises at least one selected from the group consisting of: in a panoramic video, a first current buffer length and a first target buffer length of first video data corresponding to a target viewing angle, and a second current buffer length and a second target buffer length of second video data corresponding to a user viewing angle, the user viewing angle comprises a viewing angle of a video-viewing user of the panoramic video, a coverage area of the target viewing angle is greater than a coverage area of the user viewing angle, and a video quality of the first video data is lower than a video quality of the second video data;
   generating a video data downloading request according to the buffer length, wherein the video data downloading request is a request for downloading target video data in the panoramic video stored in a server, and the target video data is associated with at least one selected from the group consisting of the first video data and the second video data; and
   sending the video data downloading request to the server, and downloading the target video data according to a received request result returned by the server with respect to the video data downloading request.

2. The method according to claim 1, wherein the buffer length comprises the first current buffer length and the first target buffer length;
   the generating a video data downloading request according to the buffer length, comprises:
   in response to the first current buffer length being smaller than the first target buffer length, generating a video data downloading request for downloading the target video data that belongs to the first video data.

3. The method according to claim 2, wherein the buffer length further comprises the second current buffer length and the second target buffer length;
   the generating a video data downloading request according to the buffer length, further comprises:
   in response to the first current buffer length being greater than or equal to the first target buffer length, determining whether the second current buffer length is smaller than the second target buffer length; and
   in response to the second current buffer length being smaller than the second target buffer length, generating a video data downloading request for downloading the target video data that belongs to the second video data.

4. The method according to claim 3, wherein the user viewing angle corresponding to the second video data that is buffered currently is a predicted viewing angle of the video-viewing user in playback time of the second video data that is buffered currently, and after the determining whether the second current buffer length is smaller than the second target buffer length, the method further comprises:
   in response to the second current buffer length being greater than or equal to the second target buffer length, predicting the user viewing angle of the video-viewing user in the playback time again, and determining a third video data in the panoramic video that corresponds to the user viewing angle predicted again and the playback time, and has a same video quality as the second video data;
   in response to the third video data comprising a fourth video data except for the second video data that is buffered currently, generating a video data downloading request for downloading the target video data obtained on a basis of the fourth video data; and
   in response to the third video data not comprising the fourth video data, determining a fifth video data in the panoramic video that has the same video quality as the second video data that is buffered currently and is adjacent in a spatial position to the second video data that is buffered currently, and generating a video data downloading request for downloading the target video data obtained on a basis of the fifth video data.

5. The method according to claim 1, further comprising at least one selected from the group consisting of:
   acquiring historical bandwidth information and historical bandwidth prediction accuracy, predicting a network bandwidth when downloading the target video data according to the historical bandwidth information and the historical bandwidth prediction accuracy, and determining the first target buffer length according to the network bandwidth; or
   when the user viewing angle is a predicted viewing angle of the video-viewing user when watching second video data to be buffered, acquiring historical viewing angle prediction accuracy, and determining the second target buffer length according to the historical viewing angle prediction accuracy and the network bandwidth.

6. The method according to claim 1, wherein the generating a video data downloading request according to the buffer length, comprises:
   predicting a network bandwidth when downloading the target video data; and
   generating the video data downloading request according to the buffer length and the network bandwidth, wherein a target code rate of the target video data represented by the video data downloading request is related to the network bandwidth.

7. The method according to claim 1, wherein a buffer is set in a terminal device configured with the client, and the buffer comprises a first buffer for buffering the first video data downloaded and a second buffer for buffering the second video data downloaded;
   after downloading the target video data, the method further comprises:
   buffering the target video data into a buffer associated with the target video data;
   when playing current video data in the panoramic video, in response to a second video data corresponding to the current video data being buffered in the second buffer, acquiring and playing the second video data corresponding to the current video data from the second buffer;

in response to the second video data corresponding to the current video data being not buffered in the second buffer, determining whether first video data corresponding to the current video data is buffered in the first buffer; and in response to the first video data corresponding to the current video data being buffered in the first buffer, acquiring and playing the first video data corresponding to the current video data from the first buffer.

8. A terminal device, comprising:
one or more processors; and
a memory, configured to store one or more programs;
when the one or more programs are executed by the one or more processors, causing the one or more processors to implement the method of video downloading according to claim 1.

9. A method of video transmission, applied to a server storing a panoramic video, comprising:
receiving a video data downloading request sent by a client, wherein the video data downloading request comprises a request for downloading target video data in the panoramic video generated according to a buffer length, and the target video data is associated with at least one selected from the group consisting of first video data or second video data;
returning a request result corresponding to the video data downloading request to the client, and causing the client to download the target video data transmitted by the server according to the request result received,
wherein the buffer length comprises at least one selected from the group consisting of: in a panoramic video, a first current buffer length and a first target buffer length of the first video data corresponding to a target viewing angle, and a second current buffer length and a second target buffer length of the second video data corresponding to a user viewing angle, the user viewing angle comprises a viewing angle of a video-viewing user of the panoramic video, a coverage area of the target viewing angle is greater than a coverage area of the user viewing angle, and a video quality of the first video data is lower than a video quality of the second video data.

10. The method according to claim 9, further comprising:
for original video data in the panoramic video that is not encoded, segmenting the original video data in space to obtain original video sub-data;
for target video sub-data corresponding to the target viewing angle and user video sub-data corresponding to the user viewing angle in the original video sub-data, encoding and updating the target video sub-data based on a first preset code rate, and using a method of scalable video coding to encode and update the user video sub-data based on a second preset rate;
the returning a request result corresponding to the video data downloading request to the client, comprising:
determining the request result corresponding to the video data downloading request according to at least one selected from the group consisting of the target video sub-data or the user video sub-data, and returning the request result to the client,
wherein the target video data downloaded by the client comprises at least one selected from the group consisting of the target video sub-data or the user video sub-data, and after the causing the client to download the target video data transmitted by the server according to the request result received, the method further comprises:
combining the target video sub-data and the user video sub-data that are downloaded and are overlapped in spatial positions, and updating the target video sub-data that is combined based on a combination result.

11. A server, comprising:
one or more processors; and
a memory, configured to store one or more programs,
wherein when the one or more programs are executed by the one or more processors, causing the one or more processors to implement the method of video transmission according to claim 9.

12. A non-transient computer-readable storage medium, wherein the non-transient computer-readable storage medium stores computer programs, when the computer programs are executed by a processor, implementing a method of video downloading, or a method of video transmission,
wherein the method of video downloading is applied to a client and comprises:
acquiring a buffer length, wherein the buffer length comprises at least one selected from the group consisting of: in a panoramic video, a first current buffer length and a first target buffer length of first video data corresponding to a target viewing angle, and a second current buffer length and a second target buffer length of second video data corresponding to a user viewing angle, the user viewing angle comprises a viewing angle of a video-viewing user of the panoramic video, a coverage area of the target viewing angle is greater than a coverage area of the user viewing angle, and a video quality of the first video data is lower than a video quality of the second video data;
generating a video data downloading request according to the buffer length, wherein the video data downloading request is a request for downloading target video data in the panoramic video stored in a server, and the target video data is associated with at least one selected from the group consisting of the first video data and the second video data; and
sending the video data downloading request to the server, and downloading the target video data according to a received request result returned by the server with respect to the video data downloading request;
wherein the method of video transmission is applied to the server storing the panoramic video and comprises:
receiving the video data downloading request sent by the client; and
returning the request result corresponding to the video data downloading request to the client, and causing the client to download the target video data transmitted by the server according to the request result received.

13. The non-transient computer-readable storage medium according to claim 12, wherein the method of video transmission further comprises:
for original video data in the panoramic video that is not encoded, segmenting the original video data in space to obtain original video sub-data;
for target video sub-data corresponding to the target viewing angle and user video sub-data corresponding to the user viewing angle in the original video sub-data, encoding and updating the target video sub-data based on a first preset code rate, and using a method of scalable video coding to encode and update the user video sub-data based on a second preset rate;

the returning the request result corresponding to the video data downloading request to the client, comprising:

determining the request result corresponding to the video data downloading request according to at least one selected from the group consisting of the target video sub-data or the user video sub-data, and returning the request result to the client, wherein the target video data downloaded by the client comprises at least one selected from the group consisting of the target video sub-data or the user video sub-data, and after the causing the client to download the target video data transmitted by the server according to the request result received, the method further comprises:

combining the target video sub-data and the user video sub-data that are downloaded and are overlapped in spatial positions, and updating the target video sub-data that is combined based on a combination result.

14. The non-transient computer-readable storage medium according to claim 12, wherein the buffer length comprises the first current buffer length and the first target buffer length;

the generating a video data downloading request according to the buffer length, comprises:

in response to the first current buffer length being smaller than the first target buffer length, generating a video data downloading request for downloading the target video data that belongs to the first video data.

15. The non-transient computer-readable storage medium according to claim 14, wherein the buffer length further comprises the second current buffer length and the second target buffer length;

the generating a video data downloading request according to the buffer length, further comprises:

in response to the first current buffer length being greater than or equal to the first target buffer length, determining whether the second current buffer length is smaller than the second target buffer length; and in response to the second current buffer length being smaller than the second target buffer length, generating a video data downloading request for downloading the target video data that belongs to the second video data.

16. The non-transient computer-readable storage medium according to claim 15, wherein the user viewing angle corresponding to the second video data that is buffered currently is a predicted viewing angle of the video-viewing user in playback time of the second video data that is buffered currently, and after the determining whether the second current buffer length is smaller than the second target buffer length, the method further comprises:

in response to the second current buffer length being greater than or equal to the second target buffer length, predicting the user viewing angle of the video-viewing user in the playback time again, and determining a third video data in the panoramic video that corresponds to the user viewing angle predicted again and the playback time, and has a same video quality as the second video data;

in response to the third video data comprising a fourth video data except for the second video data that is buffered currently, generating a video data downloading request for downloading the target video data obtained on a basis of the fourth video data; and in response to the third video data not comprising the fourth video data, determining a fifth video data in the panoramic video that has the same video quality as the second video data that is buffered currently and is adjacent in a spatial position to the second video data that is buffered currently, and generating a video data downloading request for downloading the target video data obtained on a basis of the fifth video data.

17. The non-transient computer-readable storage medium according to claim 12, wherein the method of video downloading further comprises at least one selected from the group consisting of:

acquiring historical bandwidth information and historical bandwidth prediction accuracy, predicting a network bandwidth when downloading the target video data according to the historical bandwidth information and the historical bandwidth prediction accuracy, and determining the first target buffer length according to the network bandwidth; or when the user viewing angle is a predicted viewing angle of the video-viewing user when watching second video data to be buffered, acquiring historical viewing angle prediction accuracy, and determining the second target buffer length according to the historical viewing angle prediction accuracy and the network bandwidth.

18. The non-transient computer-readable storage medium according to claim 12, wherein the generating a video data downloading request according to the buffer length, comprises:

predicting a network bandwidth when downloading the target video data; and generating the video data downloading request according to the buffer length and the network bandwidth, wherein a target code rate of the target video data represented by the video data downloading request is related to the network bandwidth.

19. The non-transient computer-readable storage medium according to claim 12, wherein a buffer is set in a terminal device configured with the client, and the buffer comprises a first buffer for buffering the first video data downloaded and a second buffer for buffering the second video data downloaded;

after downloading the target video data, the method further comprises:

buffering the target video data into a buffer associated with the target video data;

when playing current video data in the panoramic video, in response to a second video data corresponding to the current video data being buffered in the second buffer, acquiring and playing the second video data corresponding to the current video data from the second buffer;

in response to the second video data corresponding to the current video data being not buffered in the second buffer, determining whether first video data corresponding to the current video data is buffered in the first buffer; and in response to the first video data corresponding to the current video data being buffered in the first buffer, acquiring and playing the first video data corresponding to the current video data from the first buffer.

* * * * *